July 30, 1946.   O. L. GARRETSON   2,404,795
FLOAT CONTROL VALVE
Filed Nov. 16, 1943
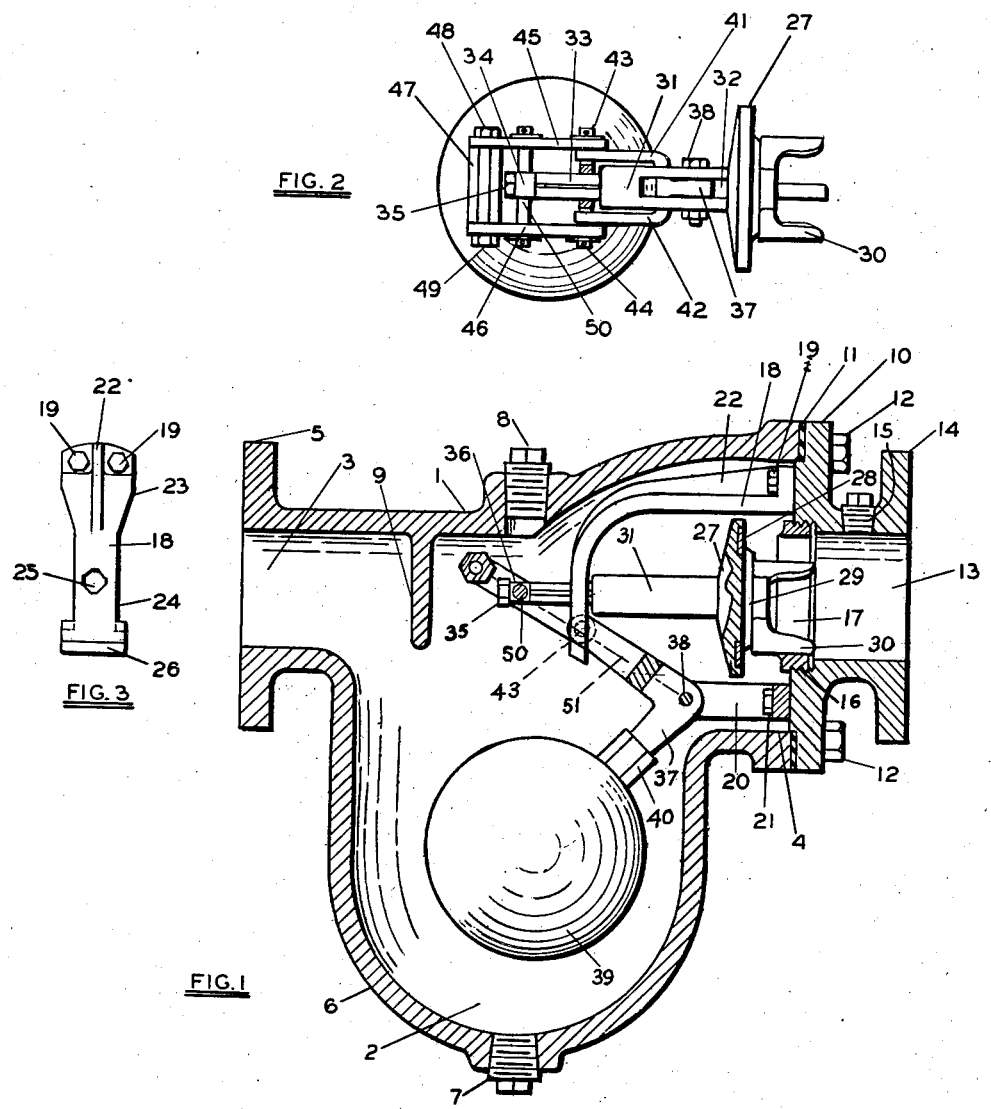
INVENTOR
O. L. GARRETSON
BY Hudson Young & Yinger
ATTORNEYS Patented July 30, 1946

2,404,795

UNITED STATES PATENT OFFICE 2,404,795

FLOAT CONTROL VALVE

Owen L. Garretson, Bartlesville, Okla., assignor to Phillips Petroleum Company, a corporation of Delaware Application November 16, 1943, Serial No. 510,521

7 Claims. (Cl. 137—68)

This invention relates to float control valves and more particularly to liquid trap gas valves in which any liquids occurring in rapidly flowing gas in a gas line may be prevented from passing through the valve in any quantity.

Float control valves have been used for several years as a device to shut off the flow of gas in case there is any carry-over of liquid from the vaporizer of an industrial gas system. They have also been used on gas lines carrying gases which may contain the gas in liquid form, moisture, or foreign liquids. It has been found that during periods of high rate of flow these valves of the prior art close even though no liquid has accumulated in the float bowl, due to the force exerted by the gas on the valve because of the high pressure drop across the valve.

As the valve remains for long periods of time in its open position there is a tendency for corrosion to set in, or for deposits of foreign substances or gummy material present in the gas to cause the valve to stick or freeze in its open position. The usual linkages employed in the prior art devices are often unable to free the valve with the available force provided by the float.

One object of this invention is to provide such a valve which cannot be closed by the gas alone, even though the velocity of the gas through the valve is raised to many times that existing in practice.

Another object of the invention is to provide a valve in which the float exercises such a great mechanical advantages over the valve in its open position that sticking of the valve in the open position is practically impossible.

Another object is to provide a float control valve which continues to operate satisfactorily at high rates of gas flow after long periods of time by the closing of the valve in response to the float only.

Another object is to provide such a valve which is easily serviced and repaired, which has few, strong and fool-proof parts, and in which the operation is simple and positive.

Other objects and advantages will be apparent to those skilled in the art upon reading the following specification and claims and studying the drawing.

In the drawing:

Figure 1 is a cross-sectional elevational view of a valve embodying my invention, the cross section being taken through the central portion of the valve with the exception that the valve stem, valve stem-supporting bracket, and the ball float are not in cross section.

Figure 2 is a plan view of the ball float and the mechanical linkage connecting the ball float to the valve head, all other parts of the device being eliminated.

Figure 3 is an elevational view of the valve head stem-supporting bracket only, looking from the left of Figure 1 to the right.

The illustrative embodiment shown in the drawing consists of a valve housing 1 having a chamber 2, an inlet 3 connected to chamber 2 and a valve receiving opening 4.

The inlet 3 may be connected to the gas supplying portion of a gas line (not shown) by means of any suitable pipe connection, flange 5 being chosen as merely an example of such a suitable connection.

The chamber 2 is provided with a dependent liquid accumulating portion 6, this portion being provided with a drain plug 7. A plug 8 is provided on the upper part of housing 1 for purposes to be explained below. A deflecting fin 9 is provided extending across chamber 2 to deflect the gas coming in inlet 3 so that it must pass down into bowl chamber 2.

The valve receiving opening 4 is covered by cover 10 which may be secured in any suitable manner, a gasket 11 and bolts 12 being shown as an illustration. The cover has an outlet 13 and is connected to the gas receiving portion of the gas line (not shown) by any suitable connecting means of which flange 14 is merely an illustrative example.

The cover 10 is provided with a screw plug 15 for purposes to be explained below and outlet 13 is enlarged and screw threaded at 16 to receive a sharp edged valve seat 17. Valve seat 17 is of slightly smaller diameter internally than outlet 13 for purposes to be explained below. Mounted on cover 10 is a first bracket 18 which may be mounted by such means as bolts 19. A second bracket 20 is also mounted on the cover and may also be secured by bolts 21.

Bracket 18 is also shown in Figure 3. Bracket 18 may be provided with reinforcing rib 22 and tapers at 23 to a narrower portion 24. In the narrower vertical portion 24 a hole 25 is cut to act as a guide. While this guide hole may be round or of any desired shape, I prefer to make it in the form of a square which has its corners slabbed off to form an octagonal shape. On the lower end of portion 24 is a T head 26 the outer ends of which act as stop members as will be explained later.

Bracket 20 is merely a simple U bracket with two arms projecting horizontally from 10.

A valve head 27 is provided to seat on seat 17. Valve head 27 has a packing ring 28 set in an annular groove in its face. Ring 28 forms a positive seal with the sharp edge on seat 17 and ring 28 is held in its groove by plate 29. Plate 29 is secured to the valve head 27 by any suitable means such as a screw (not shown) and guide arms 30 are preferably formed integral with plate 29, but may be held thereon by the same screw (not shown) that secures plate 29 to head 27. Head 27 is provided with a valve stem 31. To lighten the stem 31 a slot 32 has been cut therein, but this slot is not necessary to the operation of the device. Stem 31 has an end portion consisting of an octagonal portion 33 adapted to fit hole 25 in bracket 18 for guiding sliding motion therein. Beyond 33 the stem has a circular portion 34 which has a horizontal perforation 36 therethrough and the extreme end of 34 is provided with an axial threaded bore into which a set screw 35 may be screwed to project into the horizontal transverse bore 36.

Pivotally mounted in the two arms of bracket 20 is a bell crank 37. A pivot pin 38 is provided for this pivoting. A float 39 is provided in the dependent liquid accumulating portion 6 and is secured to bell crank 37 by suitable means 40. The shape of the float is immaterial, however a ball thereupon is probably most convenient. Bell crank 37 becomes bifurcated and has two arms 41 and 42. The ends of these two arms have outwardly projecting rods 43 and 44 thereon which act as pivots respectively for connecting two links 45 and 46. After links 45 and 46 are placed over projections 43 and 44, the connection may be completed by washers and cotter pins as shown. Links 45 and 46 are preferably merely straight lengths with three holes in them and are connected at their outer ends by spacer bar 47 which has a bore screw threaded at both ends to receive bolts 48 and 49. A pin 50 is passed through the holes in links 46 and 45 and the hole 36 in stem 34 and pin 50 is secured in position by washers and cotter pins as shown. Bracket 18 beside guiding stem 33 also acts as a stop member as the projecting ends of T head 26 are so disposed as to contact either arms 41 and 42 of bell crank 37, or links 45 and 46, or both. While any of these contacts is sufficient, I prefer for purposes of stability to have head 26 contact bell crank 37.

The operation of the device is as follows:

Gases enter inlet 3 and are deflected by 9 down into chamber 2. The gases pass rapidly through chamber 2 and out around head 27 through seat 17 and outlet 13. No matter how rapidly these gases pass, no matter how great the suction or pressure on head 27 the valve cannot close because the central line 51 between pins 50 and 38 passes so close to pivot 43 that toggle action and leverage prevents the valve from being closed by the force of the gas. Float 39 is not very heavy but it has a certain weight action downwardly, creating torque around pin 38, and it has a great mechanical advantage over the forces tending to force pins 50 and 38 together. In actual practice pivot 43 may be about one-sixteenth of an inch past the central line 51 as bell crank 37 is supported on T head 26.

If valve 27 becomes stuck in open position and liquid begins to accumulate in chamber 6, the liquid will lift ball 39 and the ball will have a toggle action providing a leverage of such great mechanical advantage that valve head 27 will be moved the first part of the way from its open position to its closed position without failure.

It is therefore evident that I have provided means whereby the force of the rapidly flowing gas is unable to overcome the forces of friction in the toggle formed by links 46 and arm 42 and the mechanical advantage of float 39 in the open position and that the mechanical advantage of float 39 is so great that sticking in the open position is avoided.

Changes may be non-inventively made in the proportion and arrangement of parts, and many parts may have equivalents of an obvious nature substituted for them without involving invention, and the modified valve will still be within the scope of my invention provided the invention is followed as set forth in the following claims.

It is obvious also that my valve is adapted for use in any system employing a float control valve of this type, and when used in such systems it is common to remove the plugs 7, 8 and 15 and attach pipes at these points. The pipe attached in place of drain plug 8 may run to a suitable pump, which may be provided with a vapor outlet line leading preferably back to the gas line leading to inlet 3, and said pipe, or said vapor outlet line, or both, may be provided with check valves preventing reverse flow back towards chamber 2. Plugs 8 and 15 may be connected by a pipe containing a normally closed manual shut off valve, and another normally open manual shut off valve may be placed in the gas line leading from outlet 13, the idea being that if the difference in gas pressure between opposite sides of seat 17 when head 27 is seated is so great that the valve 17, 27 will not open, then by closing said shut off valve in the gas line and opening said shut off valve in the line between the openings at 8 and 15 the pressure will equalize, valve 17, 27 will open and the manual valves may be returned to their respective normal positions. The systems mentioned in this paragraph are not shown in the drawings but are mentioned to show the wide field of use of the invention, and valves employed in such systems are intended to be within the scope of the following claims.

Having described my invention, I claim:

1. A liquid trap gas valve for trapping any liquids occurring in a gas line, comprising in combination a valve housing having a chamber, said chamber having a dependent liquid accumulating portion, an inlet connected to the gas supplying portion of the gas line and to the chamber, an outlet connecting the chamber to the gas receiving portion of the gas line, a valve seat mounted in said outlet and extending into the chamber, a valve head in the chamber adapted to seat on said seat in closed position and close the outlet and to move to open position and open the outlet, a lever mounted in pivotal relationship within the chamber, a float in said liquid accumulating portion secured to said lever, said lever and valve head connected by a toggle linkage, the float being normally actuated by gravity in the absence of sufficient liquid in said liquid accumulating portion to substantially straighten out the toggle to substantially dead center position and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

2. A liquid trap gas valve for trapping any liquids occurring in a gas line, comprising in combination a valve housing having a chamber, said chamber having a dependent liquid accumulating portion, an inlet connected to the gas supplying portion of the gas line and to the chamber, an outlet connecting the chamber to the gas receiving portion of the gas line, a valve seat mounted in said outlet and extending into the chamber, a valve head in the chamber adapted to seat on said seat in closed position and close the outlet and to move to open position and open the outlet, a float in said liquid accumulating portion connected to said valve head by a toggle linkage, the float being normally actuated by gravity in the absence of sufficient liquid in said liquid accumulating portion to substantially straighten out the toggle to substantially dead center position and to move said valve to said open position, the float being floated by any accumulating liquids in said liquid accumulating portion to close said valve.

3. A liquid trap gas valve for trapping any liquids occurring in rapidly flowing gas in a gas line, comprising in combination a valve housing having a chamber, an inlet connected to the gas supplying portion of the gas line and to the chamber, and a valve receiving opening, the chamber having a dependent liquid accumulating portion, drain means for the liquid accumulating portion, a cover for the valve receiving opening, said cover having an outlet connecting the chamber to the gas receiving portion of the gas line, a valve seat mounted in said outlet and extending into the chamber, a first bracket mounted on said cover and extending into the chamber, a valve head in the chamber adapted to seat on said seat in closed position and close the outlet and to move to open position and open the outlet, said first bracket having a guide and stop means thereon, a stem member on the rear of said head guided in said guide, a second bracket mounted on said cover and extending into the chamber, a bell crank lever pivoted to said second bracket, a float in said liquid accumulating portion secured to said lever, a bifurcated end on said lever, link means pivoted to said lever and to said stem member, said link means and said lever constituting a toggle, said stop means being in the path of a portion of the toggle, the float being normally actuated by gravity in the absence of sufficient liquid in said liquid accumulating portion to substantially straighten out the toggle to substantially dead center position, to force a portion of said toggle to rest on said stop, and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

4. A liquid trap gas valve for trapping any liquids occurring in rapidly flowing gas in a gas line, comprising in combination a valve housing having a chamber, an inlet connected to the gas supplying portion of the gas line and to the chamber, and a valve receiving opening, the chamber having a dependent liquid accumulating portion, a cover for the valve receiving opening, said cover having an outlet connecting the chamber to the gas receiving portion of the gas line, a valve seat mounted in said outlet and extending into the chamber, a first bracket mounted on said cover and extending into the chamber, a valve head in the chamber adapted to seat on said seat in closed position, and close the outlet and to move to open position and open the outlet, guide means mounted on the face of said head and guided in said seat, said first bracket having a guide and stop means thereon, a stem member on the rear of said head guided in said guide, a second bracket mounted on said cover and extending into the chamber, a bell crank lever pivoted to said second bracket, a float in said liquid accumulating portion secured to said lever, link means pivoted to said lever and to said stem member, said link means and said lever constituting a toggle, said stop means being in the path of a portion of the toggle, the float being normally actuated by gravity in the absence of sufficient liquid in said liquid accumulating portion to substantially straighten out the toggle to substantially dead center position, to force a portion of said toggle to rest on said stop, and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

5. A liquid trap gas valve for trapping any liquids occurring in rapidly flowing gas in a gas line, comprising in combination a valve housing having a chamber, an inlet connected to the gas supplying portion of the gas line and to the chamber, and a valve receiving opening, the chamber having a dependent liquid accumulating portion, a cover for the valve receiving opening, said cover having an outlet connecting the chamber to the gas receiving portion of the gas line, a valve seat mounted in said outlet and extending into the chamber, a first bracket mounted on said cover and extending into the chamber, a valve head in the chamber adapted to seat on said seat in closed position and close the outlet and to move to open position and open the outlet, said first bracket having a guide and stop means thereon, a stem member on the rear of said head guided in said guide, a second bracket mounted on said cover and extending into the chamber, a bell crank lever pivoted to said second bracket, a float in said liquid accumulating portion secured to said lever, link means pivoted to said lever and to said stem member, said link means and said lever constituting a toggle, said stop means being in the path of a portion of the toggle, the float being normally actuated by gravity in the absence of sufficient liquid in said liquid accumulating portion to substantially straighten out the toggle to substantially dead center position, to force a portion of said toggle to rest on said stop, and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

6. A liquid trap gas valve for trapping any liquids occurring in rapidly flowing gas in a gas line, comprising in combination a valve housing having a chamber, an inlet connected to the gas supplying portion of the gas line and to the chamber, and a valve receiving opening, the chamber having a dependent liquid accumulating portion, drain means for the liquid accumulating portion, a cover for the valve receiving opening, said cover having an outlet connecting the chamber to the gas receiving portion of the gas line, a valve seat mounted in said outlet and extending into the chamber, a first bracket mounted on said cover and extending into the chamber, a valve head in the chamber adapted to seat on said seat in closed position and close the outlet and to move to open position and open the outlet, guide means mounted on the face of said head and guided in said seat, said first bracket having a guide and stop means thereon, a stem member on the rear of said head guided in said guide, a second bracket mounted on said cover and extending into the chamber, a lever pivoted to said second bracket, a float in said liquid accumulating portion secured to said lever, a bifurcated end on said lever, link means pivoted to said lever and to said stem member, said link means and said lever constituting a toggle, said stop means being in the path of a portion of the toggle, the float being normally actuated by gravity in the absence of sufficient liquid in said liquid accumulating portion to substantially straighten out the toggle to substantially dead center position, to force a portion of said toggle to rest on said stop, and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

7. A liquid trap gas valve for trapping any liquids occurring in rapidly flowing gas in a gas line, comprising in combination a valve housing having a chamber, an inlet connected to the gas supplying portion of the gas line and to the chamber, and a valve receiving opening, the chamber having a dependent liquid accumulating portion, a cover for the valve receiving opening, said cover having an outlet connecting the chamber to the gas receiving portion of the gas line, a valve seat mounted in said outlet and extending into the chamber, a first bracket mounted on said cover and extending into the chamber, a valve head in the chamber adapted to seat on said seat in closed position and close the outlet and to move to open position and open the outlet, said first bracket having a guide and stop means thereon, a stem member on the rear of said head guided in said guide, a second bracket mounted on said cover and extending into the chamber, a lever pivoted to said second bracket, a float in said liquid accumulating portion secured to said lever, link means pivoted to said lever and to said stem member, said link means and said lever constituting a toggle, said stop means being in the path of a portion of the toggle, the float being normally actuated by gravity in the absence of sufficient liquid in said liquid accumulating portion to substantially straighten out the toggle to substantially dead center position, to force a portion of said toggle to rest on said stop, and to move said valve to said open position, the float being floated by any accumulating liquids in said liquid accumulating portion to close said valve, the substantially dead center position of the toggle acting to give toggle action whereby great force is applied by the float to move the head the first part of the way from open position to closed position.

OWEN L. GARRETSON.